United States Patent
Tang

(10) Patent No.: US 9,933,674 B2
(45) Date of Patent: Apr. 3, 2018

(54) DISPLAY PANEL, METHOD OF MANUFACTURING THE SAME AND DISPLAY DEVICE

(71) Applicant: Wuhan China Star Optoelectronics Technology Co., Ltd., Wuhan, Hubei (CN)

(72) Inventor: Yuejun Tang, Guangdong (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 0 days.

(21) Appl. No.: 15/257,102

(22) Filed: Sep. 6, 2016

(65) Prior Publication Data
US 2018/0004052 A1    Jan. 4, 2018

(30) Foreign Application Priority Data
Jul. 1, 2016  (CN) .......................... 2016 1 0512800

(51) Int. Cl.
*G02F 1/1362* (2006.01)
*G02F 1/1368* (2006.01)
*G02F 1/1343* (2006.01)
*G02F 1/1333* (2006.01)

(52) U.S. Cl.
CPC ...... *G02F 1/136209* (2013.01); *G02F 1/1368* (2013.01); *G02F 1/133345* (2013.01); *G02F 1/134309* (2013.01); *G02F 1/136227* (2013.01); *G02F 2001/13685* (2013.01); *G02F 2001/134372* (2013.01); *G02F 2001/136218* (2013.01); *G02F 2001/136222* (2013.01); *G02F 2201/121* (2013.01); *G02F 2201/123* (2013.01); *G02F 2202/104* (2013.01)

(58) Field of Classification Search
CPC ... H01L 21/775; H01L 27/12; H01L 29/6765; H01L 29/4908
See application file for complete search history.

(56) References Cited

U.S. PATENT DOCUMENTS

| 9,274,391 B2* | 3/2016 | Matsumura ....... G02F 1/136209 |
| 2012/0223313 A1* | 9/2012 | Amano ................. H01L 27/124 |
| | | 257/59 |

* cited by examiner

*Primary Examiner* — Quoc Hoang
(74) *Attorney, Agent, or Firm* — Andrew C. Cheng

(57) ABSTRACT

A display panel and the method of manufacturing the same, includes a first substrate disposed relatively to a second substrate, disposed above the first substrate. A black matrix, a poly silicon layer, a gate layer and a source drain layer disposed successively on the first substrate along direction facing the second substrate. The black matrix shelters the surrounding light which is incident from the first substrate onto the poly crystal layer, and the gate layer and the source-drain layer shelter the backlight which is incident from the second substrate onto the poly crystal layer. The manufacturing method of the display panel of the present invention could be simplified by the method described above.

8 Claims, 4 Drawing Sheets

DISPLAY PANEL, METHOD OF MANUFACTURING THE SAME AND DISPLAY DEVICE

FIELD OF THE INVENTION

The present invention is related to the display field, especially to the display panel, method of manufacturing the same, and display device.

BACKGROUND OF THE INVENTION

Currently the liquid crystal display is widely used; the high resolution display is the market trend of the development.

In order to improve the aperture ratio of the high resolution pixel, the LTPS (Low Temperature Poly-silicon) process is development and used. But the LTPS process is complex with ten to twelve steps of the photo mask which are used to make sure the performance of the LTPS TFT. The process of the LTPS display pane, plus the mask of the color filter, is more complex and the masks are more multiple.

In order to solve the technical problem described above, it needs a kind of display panel, the method of manufacturing the same, and display device.

SUMMARY OF THE INVENTION

The present invention provides a display panel and method of manufacturing the same, and the display to solve the technical problem. The present invention simplifies the process of the display panel.

Referring to the technical problem, the present invention provides a technical solution, comprising: a first substrate disposed relatively to a second substrate, disposed above the first substrate; a black matrix, a poly silicon layer, a gate layer and a source drain layer disposed successively on the first substrate along direction facing the second substrate, wherein the black matrix shelters the surrounding light which is incident from the first substrate onto the poly crystal layer, and the gate layer and the source-drain layer shelter the backlight which is incident from the second substrate onto the poly crystal layer.

The display panel comprises the color resistant layer disposed on the source-drain layer and near the side of the second substrate, and the color resistant layer forms a planarization of the source-drain layer.

The display panel comprises the color resistant layer disposed on the source-drain layer and near the side of the second substrate, and the flat layer disposed on the color resistant layer and near the surface of the second substrate, the color resistant and the flat layer flattens the source-drain layer together.

The display panel comprises the buffer layer, the gate insulating layer, and the interlayer dielectric layer, and the buffer layer is disposed on the black matrix and the first substrate, the poly silicon layer is disposed on the buffer layer, and the gate insulating layer is disposed on the poly silicon layer and the buffer layer, the gate layer is disposed on the gate insulating layer, and the interlayer dielectric layer is disposed on the gate layer and the gate insulating layer, the source-drain layer is disposed on the interlayer dielectric layer and electrically connects the poly silicon layer by a through via of the interlayer dielectric layer.

The display panel comprises the common electrode layer disposed on the color resistant layer, and the insulating layer disposed on the color resistant layer and the common electrode layer, and the pixel electrode disposed on the insulating layer, and the pixel electrode electrically connects to the source-drain layer by a through via of the insulating layer.

The display panel comprises the common electrode layer disposed on the flat layer, the insulating layer disposed on the flat layer and the common electrode layer, and the pixel electrode layer disposed on the insulating layer, and the pixel electrode electrically connects to the source-drain layer by a through via of the insulating layer.

Referring to the technical problem, the present invention provides a technical solution, comprising: deposing a black matrix, a poly silicon layer, a gate layer and a source-drain layer successively on a first substrate along direction far away from the first substrate; combining the first substrate and a second substrate to form the display panel, wherein the black matrix shelters the surrounding light which is incident from the first substrate onto the poly silicon layer, and the gate layer and the source-drain layer shelter the backlight which is incident from the second substrate onto the poly crystal layer.

After the step of deposing a black matrix, a poly silicon layer, a gate layer and a source-drain layer successively on a first substrate along direction far away from the first substrate, the method further comprises a color resistant layer disposed on the source-drain layer near side of the second substrate, and the color resistant layer flattens the source-drain layer.

Or after the step of deposing a black matrix, a poly silicon layer, a gate layer and a source-drain layer successively on a first substrate along direction far away from the first substrate further comprising further comprising the color resistant layer disposed on the source-drain layer near side of the second substrate; and the color resistant layer forms a flat layer near surface of the second substrate. after the step of deposing a black matrix, a poly silicon layer, a gate layer and a source-drain layer successively on a first substrate along direction far away from the first substrate, the step further comprises forming a partial color resistance of the color resistant layer disposed on the source-drain layer and near side of the second substrate and reserving a space for a remaining color resistance;

After the step of deposing a black matrix, a poly silicon layer, a gate layer and a source-drain layer successively on a first substrate along direction far away from the first substrate, the step further comprises forming a partial color resistance of the color resistant layer disposed on the source-drain layer and near side of the second substrate and reserving a space for a remaining color resistance; filling the material of a remaining color resistance in the space, and deposing the material of the remaining color resistance on the color resistant layer; flatting the remaining color resistant material and shaping the remaining color resistant material, to form the flat layer made by the remaining color resistance and the material of the remaining color resistant material on the color resistance; etching to reserve a predetermined position of the flat layer.

Referring to the technical problem, the present invention provides a technical solution, wherein the display comprises a display panel and a backlight module providing the backlight to the display panel.

The benefit of the present invention: the difference between the current invention and the present invention is: the present invention comprises a first substrate disposed relatively to a second substrate, disposed above the first substrate. A black matrix, a poly silicon layer, a gate layer and a source drain layer disposed successively on the first substrate along direction facing the second substrate. The black matrix shelters the surrounding light which is incident from the first substrate onto the poly crystal layer, and the gate layer and the source-drain layer shelter the backlight which is incident from the second substrate onto the poly crystal layer. According to the method described above, the black matrix shelters the surrounding light, the present invention eliminates the shield layer process which is sheltered the surrounding light.

DETAILED DESCRIPTION OF THE PREFERRED EMBODIMENTS

Referring to the diagrams and the embodiments demonstrates the present invention clearly.

Figure 1:
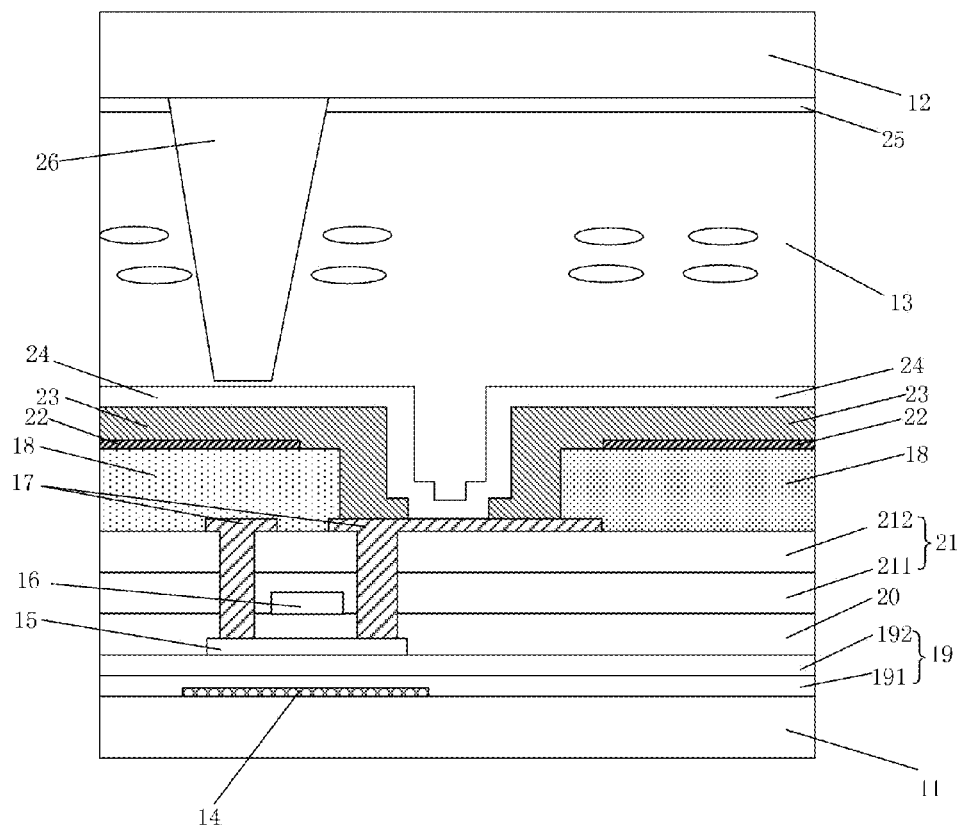
FIG. 1 demonstrates the structure diagram of the display panel of the first embodiment of the present invention.

Referring to FIG. 1 is structure diagram of the display panel of the first embodiment of the present invention, the display panel comprises the first substrate 11 and the second substrate 12 disposed on the opposite sides, the liquid crystal layer 13 between the first substrate 11 and the second substrate 12, the black matrix 14, the poly silicon layer 15, the gate layer 16, and the source-drain layer 17 are disposed on the first substrate 11 and in sequence from the first substrate 11 along the direction to the second substrate 12.

The black matrix 14 shelters the surrounding light which is incident from the first substrate 11 onto the poly silicon layer 15, and the gate layer 16 and the source-drain layer 17 shelter the backlight which is incident from the second substrate 12 onto the poly silicon layer 15. In other words, the black matrix 14 covers the plane of the vertical projection area of the poly silicon layer 15. The gate layer 16 and the source-drain layer 17 covers over the plane of the vertical projection area of the poly silicon layer 15.

Preferably the material of the black matrix layer 14 is chromium which is made by the black color metal, the desired color of metal, or other metal alloy to allow the black matrix 14 bear the high temperature process.

The black matrix 14 shelters the surrounding light which is incident from the first substrate 11 onto the poly crystal layer 15, and the gate layer 16 and the source-drain layer 17 shelter the backlight which is incident from the second substrate 12 onto the poly silicon layer 15. Therefore, the present invention eliminates the shield layer process.

Preferably the display panel further comprises the color resistant layer 18 disposed on the source-drain layer 17 and near one side of the second substrate 12. The color resistant layer 18 makes the source-drain layer 17 flat. Because of the effect of the color resistant layer 18, the source-drain layer 17 is flat and requires no flat layer. The planarization process could be eliminated.

Preferably, in the embodiment, the display panel includes a buffer layer 19, a gate insulating layer 20, and an interlayer dielectric layer 21, and the buffer layer 19 is disposed on the black matrix 14 and the first substrate 11. The poly silicon layer 15 is disposed on the buffer layer 19. The gate insulating layer 20 is disposed on the poly silicon layer 15 and the buffer layer 19, the gate layer 16 is disposed on the gate insulating layer 20, and the interlayer dielectric layer 21 is disposed on the gate layer 16 and the gate insulating layer 21, the source-drain layer 17 is disposed on the interlayer dielectric layer 21 and electrically connects with the poly silicon layer 15 by a through via of the interlayer dielectric layer 21.

Preferably the display panel further comprises the common electrode 22 disposed on the color resistant layer 18, and the insulating layer 23 disposed on the color resistant layer 18 and the common electrode layer 22, and the pixel electrode 24 disposed on the insulating layer 23, the pixel electrode 24 electrically connects to the source-drain layer 17 by the through via of the insulating layer 23.

Preferably the buffer layer 19 includes the stacking of the silicon nitride layer 191 and the silicon oxide layer 192. More preferably, the silicon nitride layer 191 is disposed on the black matrix 14 and the first substrate 11. The silicon oxide layer 192 disposed on the silicon nitride layer 191. In the other embodiment, the position of the silicon nitride layer 191 and the silicon oxide layer 192 could be exchanged each other. It means that the silicon oxide layer 192 is disposed on the black matrix 15 and the first substrate 11, and the silicon nitride layer 191 disposed on the silicon oxide layer 192.

Preferably the interlayer dielectric layer 21 comprises the silicon oxide layer 211 and silicon nitride layer 212. More preferably the silicon oxide 211 is disposed on the gate layer 16 and the gate insulating layer 20, and the silicon nitride layer 212 is disposed on the silicon oxide layer 211. In another embodiment, the position of the silicon oxide layer 211 and the silicon nitride layer 212 could be exchanged each other, it means that the silicon nitride layer 212 is disposed on the gate layer 16 and the gate insulating layer 20, and the silicon oxide layer 211 is disposed on the silicon nitride layer 212.

Preferably the insulating layer 25 is disposed on a side of the second substrate 12 and near the first substrate 11. The insulating layer 25 could be one material of the silicon nitride, the silicon oxide, the resin planarization layer, or the combination of the materials described above.

Preferable the support column 26 is disposed on the surface of the second substrate 12 and near the first substrate 11. In another embodiment, the support column (not shown) is disposed on the surface of the insulating layer 25 and near the first substrate 11; or the support column 26 is disposed on the first substrate 11, a portion of the support column 26 is formed by etching or development process.

Figure 2:
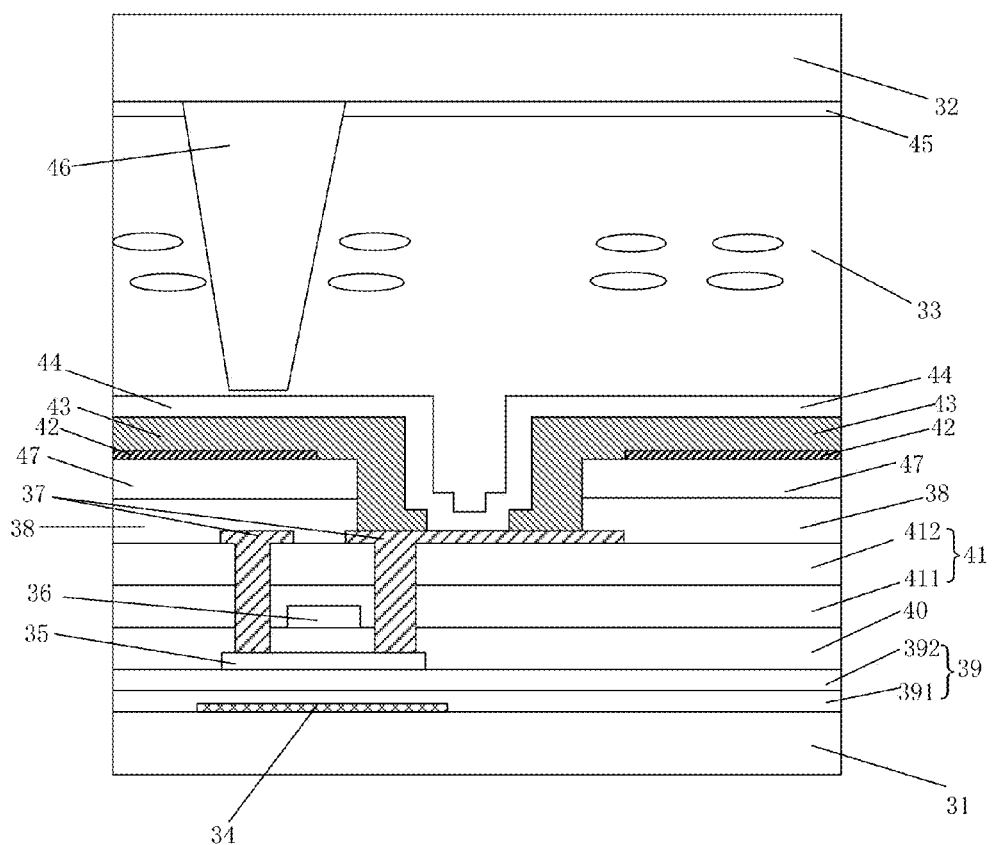
FIG. 2 illustrates the structure diagram of the display panel of the second embodiment of the present invention.

Referring to FIG. 2 illustrates the display panel structure diagram of the second embodiment of the second invention. In the embodiment, the display panel comprises the first substrate 31 and the second substrate 32 disposed on the opposite sides, the liquid crystal layer 33 between the first substrate 31 and the second substrate 32, the black matrix 34, the poly silicon layer 35, the gate layer 16, and the source-drain layer 37 are disposed on the first substrate 31 and in sequence from the first substrate 31 along the direction to the second substrate 32.

The black matrix 34 shelters the surrounding light which is incident from the first substrate 31 onto the poly silicon layer 35, and the gate layer 36 and the source-drain layer 37 shelter the backlight which is incident from the second substrate 32 onto the poly crystal layer 35. In other words, the black matrix 34 on plan of the vertical projection area of the poly silicon layer 35 covers the poly silicon layer 35, the gate layer 36 and the source-drain layer 37 on plan of the vertical projection area of the poly silicon layer 35 covers the poly silicon layer 35.

Preferably the material of the black matrix layer 34 is chromium which is made by the black color metal, the desired color of metal, or other metal alloy to allow the black matrix 34 bear the high temperature process.

The black matrix 34 shelters the surrounding light which is incident from the first substrate 31 onto the poly crystal layer 35, and the gate layer 36 and the source-drain layer 37 shelter the backlight which is incident from the second substrate 32 onto the poly crystal layer 35. Therefore, the present invention eliminates the shield layer process.

Preferably the display panel still comprises a color resistant layer 38 disposed on the source-drain layer 37 and near the side of the second substrate 32, and a flat layer 47 disposed on the color resistant layer 38 and near the surface of the second substrate 32, the color resistant 38 and the flat layer 47 flats the source-drain layer 37.

Because of the effect of the color resistant layer 38 and the flat layer 47, the thinner flat layer 47 is disposed and saves the material of the flat layer 47. For example, thin type of the flat layer 47 is formed on the color resistant layer 38 after forming the color resistant layer 38. Or for example, in the RGBW type display, reserving a space for W (white) color resistant are reserved and the W color resistant are formed by the spin coating or the slit coating in the W color resistant space reserved, and the W color resistant which is higher than RGB color resistant is flatted to form the thin flat layer 47, the material of the W color resistant is used as the flat layer 47.

Preferably in the embodiment the display panel comprises the buffer layer 39, the gate insulating layer 40, and the interlayer dielectric layer 41, the buffer layer 39 is disposed on the black matrix 34 and the first substrate 31. The poly silicon layer 35 is disposed on the buffer layer 39, and the gate insulating layer 40 is disposed on the poly silicon layer 35 and the buffer layer 39. The gate layer 36 is disposed on the gate insulating layer 40, and the interlayer dielectric layer 41 is disposed on the gate layer 36 and the gate insulating layer 40. The source-drain layer 37 is disposed on the interlayer dielectric layer 41 and electrically connects with the poly silicon layer 35 by a through via of the interlayer dielectric layer 41.

Preferably the display panel comprises the common electrode layer 42 disposed on the flat layer 47, the insulating layer 43 disposed on the flat layer 47 and the common electrode layer 42, and the pixel electrode 44 disposed on the insulating layer 43, the pixel electrode 44 electrically connects to the source-drain layer 37 by a through via of the insulating layer 43.

Preferably the buffer layer 39 includes the stacking of the silicon nitride layer 391 and the silicon oxide layer 392. More preferably the Silicon nitride layer 391 disposed on the black matrix 34 and the first substrate 31. The silicon oxide layer 392 disposed on the silicon nitride layer 391. In the other embodiment, the position of the silicon nitride layer 391 and the silicon oxide layer 392 could be exchanged each other, it means that the silicon oxide layer 392 is disposed on the black matrix 34 and the first substrate 31, and the silicon nitride layer 391 disposed on the silicon oxide layer 392.

Preferably the interlayer dielectric layer 41 comprises the silicon oxide layer 411 and silicon nitride layer 412. More preferably, the silicon oxide 411 is disposed on the gate layer 36 and the gate insulating layer 40, and the silicon nitride layer 412 is disposed on the silicon oxide layer 411. In another embodiment, the position of the silicon oxide layer 411 and the silicon nitride layer 412 could be exchanged each other, it means that the silicon nitride layer 412 is disposed on the gate layer 36 and the gate insulating layer 40, and the silicon oxide layer 411 is disposed on the silicon nitride layer 412.

Preferably the insulating layer 45 is disposed on a side of the second substrate 32 and near the first substrate 31. The insulating layer 45 could be one material of the silicon nitride, the silicon oxide, the resin planarization layer, or the combination of the materials described above.

Preferable the support column 46 is disposed on the surface of the second substrate 32 and near the first substrate 31. In another embodiment, the support column (not shown) is disposed on the surface of the insulating layer 45 and near the first substrate 31; or the support column 46 is disposed on the first substrate 31, a portion of the support column 46 is formed by etching or development process.

Comprehensively the display panel of the first embodiment and the second embodiment of the present invention illustrates the partial structure of the FFS (Fringe Filed Switching) display mode, and the other portion of the structure of the display panel pixel could be different from the diagram. The present invention shows the portion of the structure of the pixel of the display module, the spirit of the present invention is suitable for the pixel structure of the other display mode, for example, VA (vertical alignment) mode, TN (twisted nematic) mode . . . tec.

Figure 3:
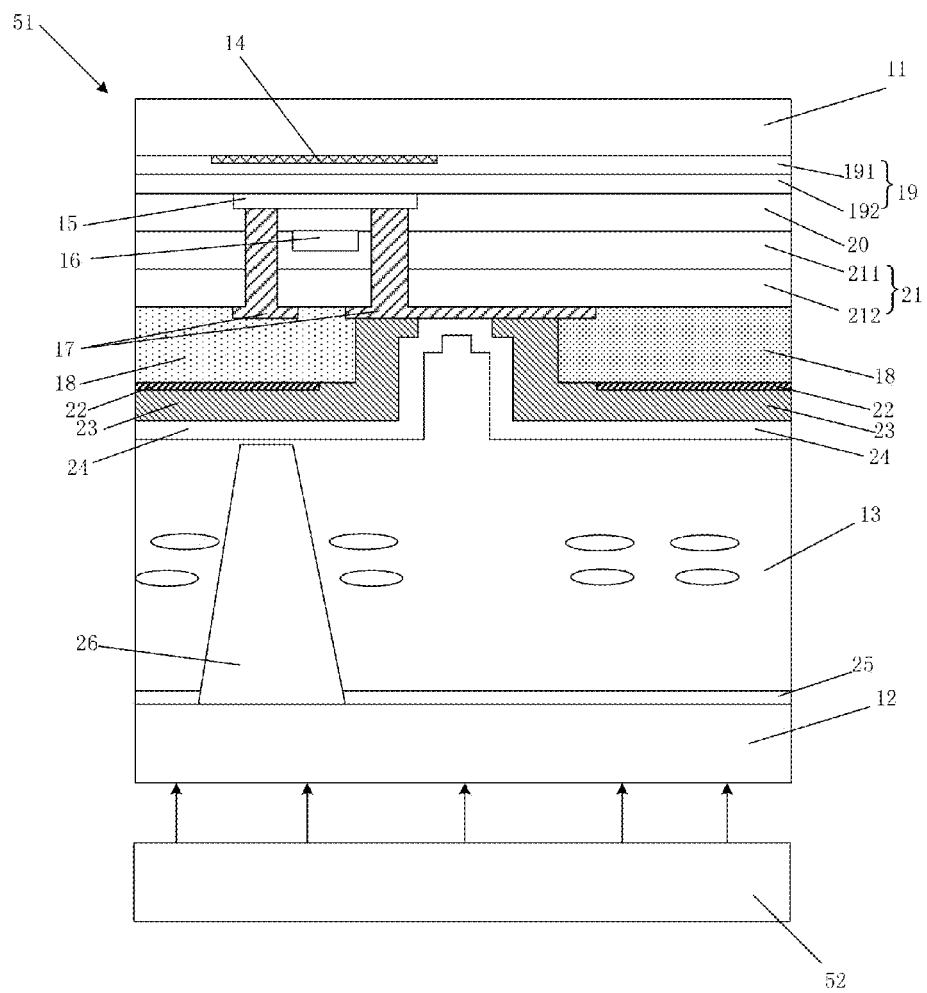
FIG. 3 is the structure diagram of the display of the present invention.

Referring to FIG. 3 is the display structure diagram of the present invention. In this embodiment, the display comprises the display panel 51 and the backlight module 52 which is provided the backlight to the display panel 51. The display panel 51 could be any kind of embodiment of the display described above. For example, FIG. 3 is the embodiment of the display panel, but the display panel could be any kind of the other embodiment of the display panel described above. Preferably in the FIG. 1, the first substrate 11 is the TOP substrate (upper substrate); the second substrate 12 is the BOTTOM substrate. FIG. 1 and FIG. 2 shows the display panel upside down.

Figure 4:
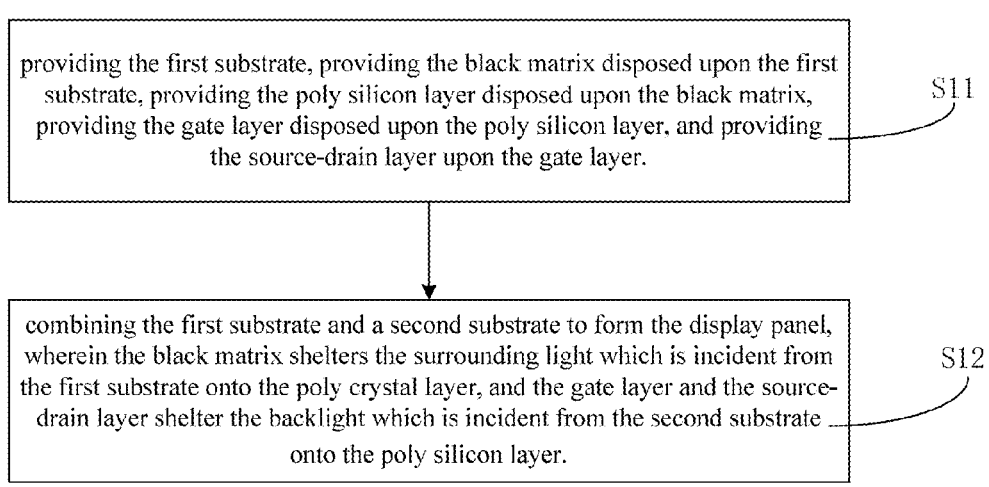
FIG. 4 is the flow chart of the manufacturing process of the display panel of the present invention.

Referring to FIG. 4 is the process diagram of the display panel manufacturing method of the present invention, the manufacturing method of the display panel comprises: Step S11: providing the first substrate, providing the black matrix disposed upon the first substrate, providing the poly silicon layer disposed upon the black matrix, providing the gate layer disposed upon the poly silicon layer, and providing the source-drain layer upon the gate layer.

In the Step S11, the embodiment comprises forming the black matrix upon the first substrate, forming the buffer layer upon the poly silicon layer and the buffer layer, forming the gate layer upon the gate insulating layer, forming the interlayer dielectric layer upon the gate layer and the gate insulating layer, forming the source-drain layer upon the interlayer dielectric layer, and forming the through via for electrically connection between the source-drain layer and the poly silicon layer. Preferably, wherein forming the buffer layer upon the black matrix and the first substrate comprises: forming the silicon nitride layer upon the black matrix and the first substrate, forming the silicon oxide layer upon the silicon nitride layer. Preferably, wherein forming the interlayer dielectric layer upon the gate layer and the gate insulating layer comprises forming the silicon oxide layer upon the gate layer and the gate insulating layer, and forming the silicon oxide layer upon the silicon nitride layer. The above description is the layer structure of the FFS display mode and is different from the other display mode, for example VA mode (vertical alignment), TN mode (twisted nematic) mode . . . etc.

Step S12: The display panel is disposed face to face by the first substrate and the second substrate, the black matrix shelters the surrounding light which is incident from the first substrate onto the poly crystal layer, and the gate layer and the source-drain layer shelter the backlight which is incident from the second substrate onto the poly crystal layer.

In the manufacturing method process which is described above, the black matrix covers over the plane of the vertical projection area of the poly silicon layer. The gate layer and the source-drain layer cover over the plane of the vertical projection area of the poly silicon layer covers the poly silicon layer. The black matrix shelters the surrounding light which is incident from the first substrate onto the poly crystal layer, and the gate layer and the source-drain layer shelter the backlight which is incident from the second substrate onto the poly crystal layer. Therefore, the shield layer process is eliminated.

Further, in the first status, after the Step S11, comprises: forming the color resistant layer disposed on the source-drain layer and near the side of the second substrate, and the color resistant layer flats the source-drain layer, forming the common electrode on the color resistant layer, forming the buffer layer on the color resistant layer and the common electrode layer, forming the pixel electrode on the insulating layer. Therefore, the present invention eliminates the shield layer process, further, eliminates the flat layer process, the color resistant acts as the flat layer.

In the second status, after the Step S11, further comprises: forming the color resistant layer disposed near the side of the second substrate on the source-drain layer, forming the flat layer on the surface of the color resistant layer and near the second substrate, forming the common electrode on the flat layer, forming the insulating layer on the color resistant layer and the common electrode layer, forming the pixel electrode on the insulating layer. Therefore, it eliminates the shield layer process, further, eliminates the flat layer process, only need to form the thin flat layer on the color resistant layer.

In the third status, after the Step S11, further comprises forming a partial color resistance of the color resistant layer disposed near the side of the second substrate on the source-drain layer, and reserve a space for the color resistance; filling in the material of the remaining color resistance, and disposing the material of the remaining color resistance on the color resistant layer; making the remaining color resistant material flat and forming the remaining color resistant material, forming the flat layer formed by the remaining color resistance and the remaining color resistant material on the color resistance; etching to reserve a predetermined position of the flat layer, forming the pixel electrode on the flat layer, forming the insulating layer on the color resistant layer and the common electrode layer, forming the pixel electrode on the insulating layer. Therefore, it eliminates the shield layer process and save the material of the flat layer, only need to form the thin flat layer on the color resistant layer. It could use the material of the color resistant layer to be the flat layer.

In the third status, for example, in the RGBW type display, after forming the RGB color resistant, reserving a space for W color resistant and forming the W color resistant by the spin coating or the slit coating in the W color resistant space reserved, and the W color resistant which is higher than RGB color resistant is flatted to form the thin flat layer, the material of the W color resistant is used as the flat layer. In the third status, because of the color resistant layer being thicker, and the common electrode, the pixel electrode, and the insulating layer being thinner, the planarization of the color resistant layer is important to the layers on the first substrate. The planarization of the common electrode layer, pixel electrode, and insulating layer depends on the planarization of the color resistant layer, after forming the pixel electrode on the insulating layer, makes the support column.

Preferably, after the Step S11, the method further comprises forming the insulating layer on the second substrate. The insulating layer 45 could be one material of the silicon nitride, the silicon oxide, the resin planarization layer, or the combination of the materials described above.

The display panel of the present invention comprises the first substrate, the second substrate disposed above the first substrate, the black matrix disposed on the first substrate, a poly silicon layer disposed above the black matrix, the gate layer disposed above the poly silicon layer, and a source-drain layer disposed above the gate layer, wherein the black matrix shelters the surrounding light which is incident from the first substrate onto the poly crystal layer, and the gate layer and the source-source-drain layer shelter the backlight which is incident from the second substrate onto the poly crystal layer. According to the method described above, the present invention shelters the surrounding light by the black matrix, and shelters the backlight by the source-drain layer and the gate layer, eliminates the process of shield layer, the RGB, RGBW color resistant layer acted as the flat layer of the TFT eliminates the process of the flat layer.

The present invention is not limited to the forgoing embodiment, and a variety of modifications can be made without departing from the scope defined by the claims. Embodiments obtained by appropriately combining technical means disclosed in different embodiments are also included in the technical range of the present invention.

What is claimed is:

1. A display panel, comprising:
a first substrate disposed relatively to a second substrate, disposed above the first substrate;
a black matrix, a poly silicon layer, a gate layer and a source drain layer disposed successively on the first substrate along direction facing the second substrate,
wherein the black matrix shelters surrounding light which is incident from the first substrate onto the poly silicon layer, and the gate layer and the source-drain layer shelter backlight which is incident from the second substrate onto the poly silicon layer, and wherein the display panel comprises a color resistant layer disposed on the source-drain layer and near side of the second substrate, and a flat layer disposed on the color resistant layer and near surface of the second substrate, the color resistant layer and the flat layer flattens the source-drain layer together.

2. The display panel of claim 1, wherein the display panel comprises a color resistant layer disposed on the source-drain layer and near side of the second substrate, and the color resistant layer flattens the source-drain layer.

3. The display panel of claim 2, wherein the display panel comprises a common electrode layer disposed on the color resistant layer, an insulating layer disposed on the color resistant layer and the common electrode layer, and a pixel electrode disposed on the insulating layer, the pixel electrode electrically connects to the source-drain layer by a through via of the insulating layer.

4. The display panel of claim 1, wherein the display panel comprises a buffer layer, a gate insulating layer, and an interlayer dielectric layer, the buffer layer is disposed on the black matrix and the first substrate, the poly silicon layer is disposed on the buffer layer, the gate insulating layer is disposed on the poly silicon layer and the buffer layer, the gate layer is disposed on the gate insulating layer, and the interlayer dielectric layer is disposed on the gate layer and the gate insulating layer, the source-drain layer is disposed on the interlayer dielectric layer and electrically connects to the poly silicon layer by a through via of the interlayer dielectric layer.

5. The display panel of claim 1, wherein the display panel comprises a common electrode layer disposed on the flat layer, an insulating layer disposed on the flat layer and the common electrode layer, and a pixel electrode layer disposed on the insulating layer, the pixel electrode electrically connects to the source-drain layer by a through via of the insulating layer.

6. A display comprising the display panel of claim 5 and a backlight module providing the backlight for the display panel.

7. A method of manufacturing a display panel, comprising:
- deposing a black matrix, a poly silicon layer, a gate layer and a source-drain layer successively on a first substrate along direction far away from the first substrate;
- after the step of deposing a black matrix, a poly silicon layer, a gate layer and a source-drain layer successively on a first substrate along direction far away from the first substrate further comprising:
  - forming a partial color resistance of the color resistant layer disposed on the source-drain layer and near side of the second substrate and reserving a space for a remaining color
  - filling the material of a remaining color resistance in the space, and deposing the material of the remaining color resistance on the color resistant layer;
  - flatting the remaining color resistant material and shaping the remaining color resistant material, to form the flat layer made by the remaining color resistance and the material of the remaining color resistant material on the color resistance;
  - etching to reserve a predetermined position of the flat layer; and
- combining the first substrate and a second substrate to form the display panel, wherein the black matrix shelters the surrounding light which is incident from the first substrate onto the poly silicon layer, and the gate layer and the source-drain layer shelter the backlight which is incident from the second substrate onto the poly silicon layer.

8. The method of manufacturing the display panel of claim 7, wherein after the step of deposing a black matrix, a poly silicon layer, a gate layer and a source-drain layer successively on a first substrate along direction far away from the first substrate further comprising a color resistant layer disposed on the source-drain layer near side of the second substrate, and the color resistant layer flattens the source-drain layer; or after the step of deposing a black matrix, a poly silicon layer, a gate layer and a source-drain layer successively on a first substrate along direction far away from the first substrate further comprising the color resistant layer disposed on the source-drain layer near side of the second substrate; and the color resistant layer forms a flat layer near surface of the second substrate.

\* \* \* \* \*